United States Patent
Saxena et al.

(10) Patent No.: US 7,617,980 B2
(45) Date of Patent: Nov. 17, 2009

(54) INTEGRATED OPTICAL MODULE FOR REFLECTANCE SENSING

(75) Inventors: Kuldeep Kumar Saxena, Singapore (SG); Wee Sin Tan, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 647 days.

(21) Appl. No.: 11/113,693

(22) Filed: Apr. 25, 2005

(65) Prior Publication Data

US 2006/0237540 A1   Oct. 26, 2006

(51) Int. Cl.
*G06K 7/10* (2006.01)
(52) U.S. Cl. .................................... 235/454; 235/439
(58) Field of Classification Search ............... 235/439, 235/454, 462.42, 472.01–472.03, 473
See application file for complete search history.

(56) References Cited

U.S. PATENT DOCUMENTS

| 4,143,809 | A | | 3/1979 | Uebbing |
| 4,330,202 | A | | 5/1982 | Yokota |
| 4,682,886 | A | | 7/1987 | Toyama et al. |
| 5,227,861 | A | * | 7/1993 | Nishizawa et al. .......... 356/497 |
| 5,657,303 | A | * | 8/1997 | Namoto et al. ........... 369/44.32 |
| 5,920,061 | A | * | 7/1999 | Feng .................... 235/472.01 |
| 6,215,959 | B1 | | 4/2001 | Mori et al. |
| 6,572,019 | B1 | * | 6/2003 | Rando et al. ........... 235/472.01 |
| 6,803,560 | B1 | * | 10/2004 | Okumura et al. ....... 250/231.16 |

* cited by examiner

*Primary Examiner*—Seung H Lee

(57) ABSTRACT

Reflection of light from a surface is sensed by emitting light from a light emitting diode and focusing the light using an aspherical emitter lens to illuminate a reflecting surface. Light reflected by the reflecting surface is focused onto a photodetector using an aspherical collector lens. The light emitting diode is displaced from the optical axis of the aspherical emitter lens and the photodetector is displaced from the optical axis of the aspherical collector lens.

12 Claims, 2 Drawing Sheets

INTEGRATED OPTICAL MODULE FOR REFLECTANCE SENSING

FIELD

This invention relates generally to the field of optical sensing. More particularly, this invention relates to an optical sensor module for reflectance sensing.

BACKGROUND

Examples of reflectance sensing include bar code sensing, edge detection, and reflective position encoding. Bar code technology is well established and provides an accurate, easy and inexpensive method of data storage and data entry for computerized information management systems. Various optical scanning systems have been developed for reading bar codes appearing on a label or on the surface of an article. Generally a bar code is a series of lines (bars) and spaces having various widths. The light reflecting characteristic of a line is different to that of a space. The information is encoded as width variations. The most common type of data stored in a bar code is item identification information, used for inventory control, process tracking, distribution tracking and other material management functions. In these applications, the bar code may represent a product number, serial number or encoded description of the item. Bar codes are also used where information about an item or a transaction must be accurately entered into a computer.

Optical scanners are used to detect the bar code and transform the bar code information into electrical signals, which are then decoded into alphanumeric characters.

A number of different scanning systems have been developed for bar code reading, these include laser scanners, charge coupled device (CCD) scanners and scanners using light emitting diodes (LED) and photodiodes.

An LED bar code scanner typically consists of an LED and a photodiode packaged with suitable electronics and focusing optics. The optical elements focus the LED light as a spot that has a width less than or equal to the smallest line width in a product barcode. The reflected light is received by the photodiode and the presence or absence of light at the photodiode is detected.

LED scanners may be compact and lightweight and may be used in a variety of applications including bar code scanning, edge sensing and positioning and optical tachometers.

Since an LED emits radiation over an extremely large aperture angle, optical lenses are used when it is desirable to focus the radiation on small area. Optical lenses have been used with LED's in optical sensors and for coupling light to optical fibers. These lenses are used with the LED positioned on the optical axis of the lens.

Lenses are also used to focus light from an illuminated object onto a photodiode. Again, these lenses are used with the photodiode positioned on the optical axis of the lens.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
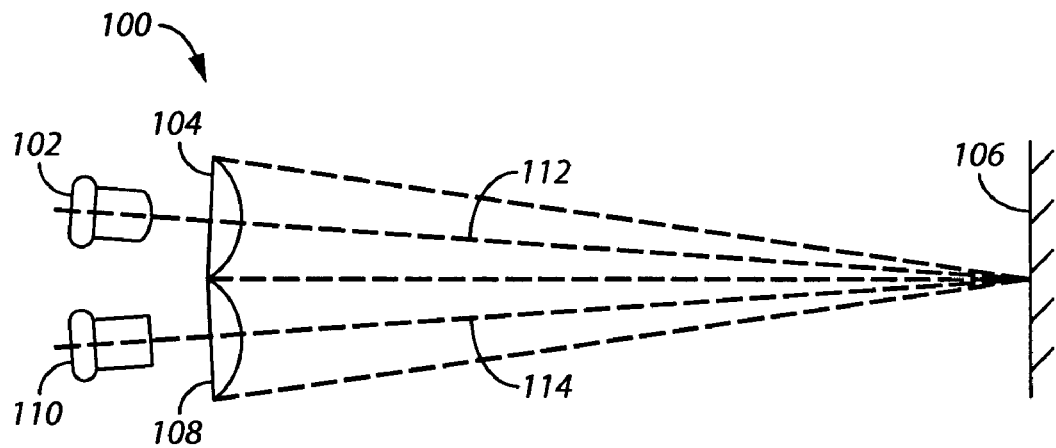
FIG. 1 is a diagrammatic representation of an optical sensor of the prior art.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

FIG. 1 is a diagrammatic representation of an optical sensing system 100 of the prior art. Referring to FIG. 1, light emitted by light emitting diode (LED) 102 passes through a first lens 104 and is focused on a reflecting surface 106. Light reflected from the surface 106 passes through a second lens 108 and is received by a photodetector 110, where it is converted into an electrical signal. The photodetector may be a photodiode or phototransistor, for example. The lenses 104 and 108 are tilted resulting in obliquity in its optical axis with respect to mechanical axis. The LED 102 is positioned on the mechanical axis 112 of the tilted lens 104. The photodetector 110 is positioned on the mechanical axis 114 of the tilted lens 108.

Figure 2:
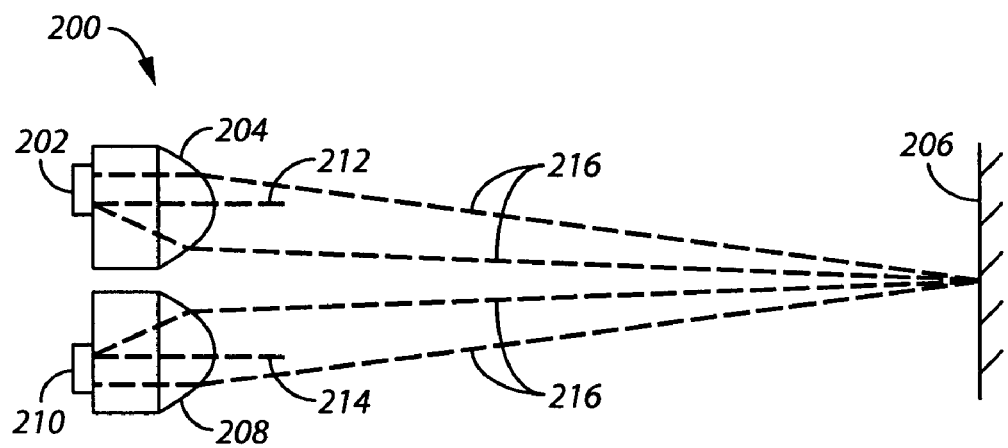
FIG. 2 is a diagrammatic representation of an optical sensor in accordance with an embodiment of the present invention.

FIG. 2 is a diagrammatic representation of an optical sensor 200 in accordance with an embodiment of the present invention. In this embodiment an LED die is embedded in aspheric lens to form an integrated optical module. A photodiode or phototransistor die is also embedded in an aspheric lens. This is in contrast to the previous sensors in which additional lenses are required for the LED and for the photodiode or phototransistor. Referring to FIG. 2, light emitted by light emitting diode (LED) die 202 passes through an aspherical emitter lens 204 and is focused on a region of a reflecting, surface 206 at a specified distance from the lens. Light reflected from the surface 206 passes through an aspherical collector lens 208 and is received by a photodetector die 210, where it is converted into an electrical signal. The LED die 202 is displaced from the optical axis 212 of the aspherical emitter lens 204. The photodetector die 210 is displaced from the optical axis 214 of the aspherical collector lens 208. The aspherical emitter lens 204 is positioned in close proximity to the aspherical collector lens 208 with the optical axis 212 of the aspherical emitter lens 204 parallel to the optical axis 214 of the aspherical collector lens 208. The geometrical arrangement of the LED die 202 and the photodetector die 210 with respect to the lenses 204 and 208 facilitates the manufacture of a compact sensing system.

Displacing the LED and photodetector from the optical axis improves optical coupling between the LED and the surface and between the surface and the photodetector.

The amount of light received by the photodetector is dependent upon the optical reflectance of the region of the surface illuminated by the emitter.

Since the LED die 202 and the photodetector die 210 are displaced from the optical axis of the lens 204 and 208, a spherical lens is not optimal for focusing the light from the LED die 202 onto the surface 206, or for focusing light from the surface 206 onto the photodetector die 210. The shape of the lenses 204 and 208 may be determined by an optimization process that uses ray tracing to estimate the performance of trial lens shapes and selects the final lens shape dependent upon a quality criterion. Rays 216 from the LED die 202 to the surface 206 and from the surface 206 to the photodetector die 210 are used. One quality criterion is the spot size produced at a prescribed distance from the lens. Another quality criterion is the modulation transfer function. For application in a bar code scanner, the shape of the emitter lens should result in a spot size that is small enough to resolve the bar code pattern. In one embodiment of the invention, the lens is designed to resolve a bar code pattern having 0.5 mm separation. In this embodiment, most of the energy from the LED die is focused onto a spot of 0.5 mm width or smaller.

In one embodiment of the invention, the lenses 204 and 208 have profiles that are symmetrical about the optical axis and have a substantially elliptical cross section.

Figure 3:
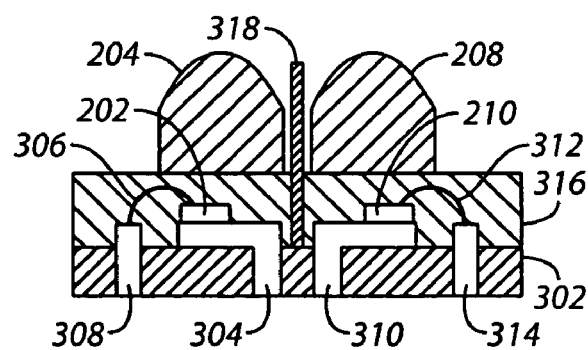
FIG. 3 is cross-sectional view of an optical sensor module in accordance with an embodiment of the invention.

FIG. 3 is cross-sectional view of an optical sensor module 300 in accordance with an embodiment of the invention. Referring to FIG. 3, an optical sensor is mounted on a substrate or printed circuit board 302. A light emitting diode semiconductor die 202 is supported by an LED cathode lead frame 304 and is electrically connected via wire bond 306 to an LED anode lead frame 308. Similarly, photodetector die 210 is supported by a lead frame 310 and is electrically connected via wire bond 312 to a lead frame 314. The lead frames may pass through the substrate 302 to provide electrical terminals to facilitate attachment of the optical sensor module 300 to a main circuit board. The main circuit board may include an electrical circuit that provides an electrical drive signal the light emitting diode and receives the electrical signal produced by the photodetector. The emitter lens 204 and collector lens 208 may be formed by placing the substrate 302 on a mold fixture and casting an encapsulating material, such as epoxy. In addition to forming the lenses, the encapsulating material may form a layer 316 that fills in the contours of the substrate and its attachments. An optical barrier 318 may be positioned between the light emitting diode and the photodetector to prevent light from the light emitting diode reaching the photodetector along a direct optical path.

Figure 4:
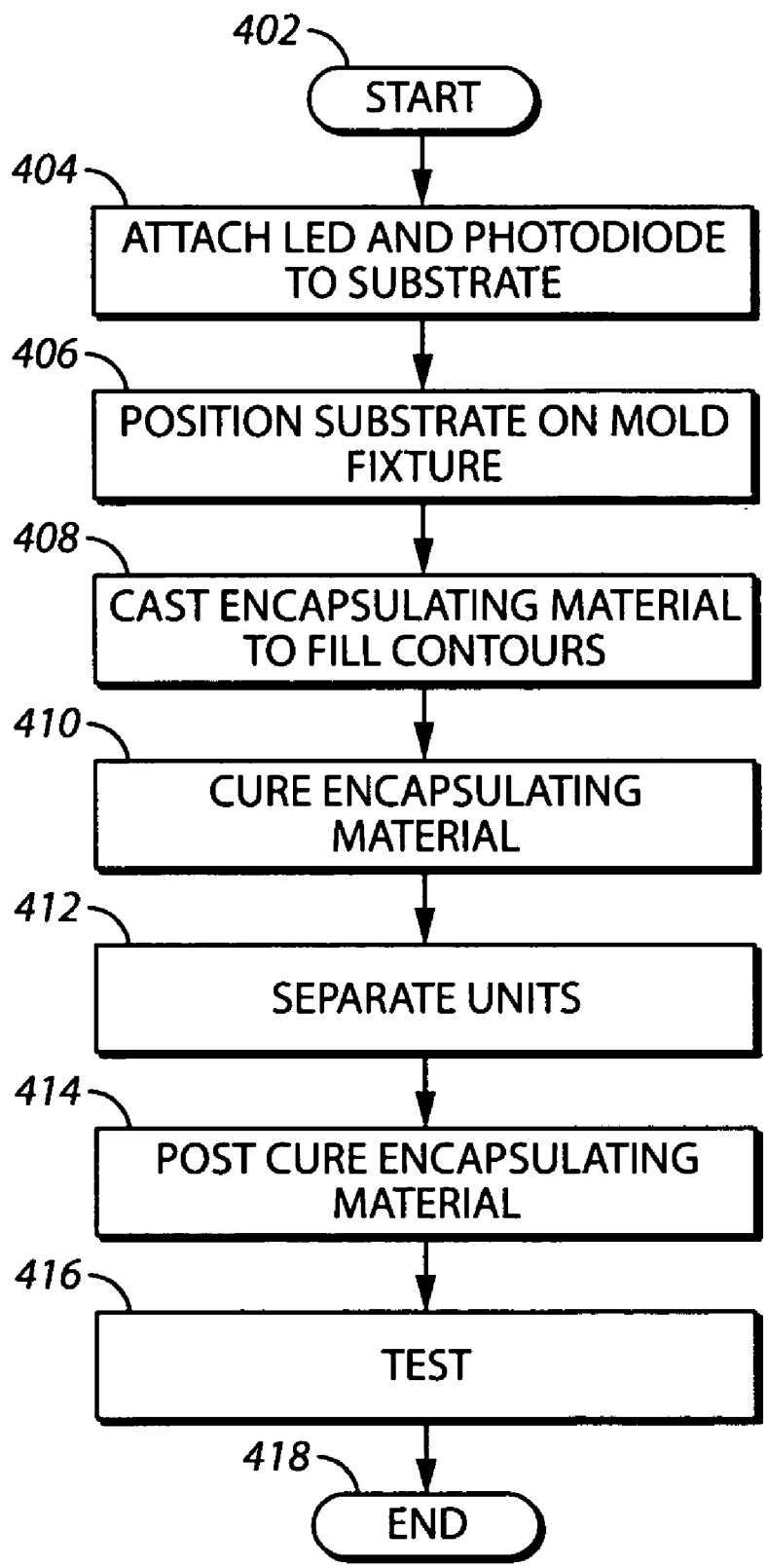
FIG. 4 is a flow chart of a method of manufacture for an optical sensor module in accordance with an embodiment of the invention.

FIG. 4 is a flow chart of a method of manufacture for an optical sensor module in accordance with an embodiment of the invention. Following start block 402 in FIG. 4, one or more LED and photodetector semiconductor dice are attached to a substrate or printed circuit board at block 404. The substrate may support multiple sensor units, allowing multiple sensor modules to be manufactured together. At block 406 the substrate, together with its attached semiconductor dice, is positioned on a mold fixture. The mold fixture includes a transfer mold defining the shape of the emitter and collector lenses with the designed lens spacing. At block 408, the mold is filled with a transparent encapsulating material. At block 410, the encapsulating material is cured at an appropriate temperature. If the substrate supports multiple sensor units, the units may be separated at block 412, by sawing for example. At block 414 the separated units are subject to a post cure at a specified temperature. The units may be tested for correct operation at block 416. The process terminates at block 418.

While the invention has been particularly shown and described with reference to a preferred embodiment, it will be understood by those of ordinary skill in the art that various changes in form and detail may be made therein without departing from the spirit and scope of the invention. Accordingly, it is intended that the present invention embrace all such alternatives, modifications and variations as fall within the scope of the appended claims.

What is claimed is:

1. An optical sensor module comprising:
an aspherical emitter lens having an optical axis;
a light emitting diode die positioned to illuminate the aspherical emitter lens and displaced from the optical axis of the aspherical emitter lens;
an aspherical collector lens having an optical axis;
a photodetector die positioned to receive light from the aspherical collector lens and displaced from the optical axis of the aspherical collector lens; wherein the aspherical emitter lens is operable to focus light from the emitting diode die within a specified diameter at specified distance from the light emitting diode die and the aspherical collector lens is operable to focus light received from outside of the photodetector die within a specified diameter at the photodetector die; and
a substrate, wherein the light emitting diode die and the photodetector die are mounted on the substrate and the emitter and collector lenses are formed on the substrate.

2. An optical sensor accordance in accordance with claim 1, wherein the aspherical emitter lens is positioned in close proximity to the aspherical collector lens with the optical axis of the aspherical emitter lens parallel to the optical axis of the aspherical collector lens.

3. An optical sensor module in accordance with claim 1, wherein the light emitting diode die is embedded in the aspherical emitter lens.

4. An optical sensor module in accordance with claim 1, wherein the photodetector die is embedded in the aspherical collector lens.

5. An optical sensor module in accordance with claim 1, wherein at least one of the aspherical emitter lens and the aspherical collector lens has a substantially elliptical profile.

6. An optical sensor module in accordance with claim 1, further comprising an electrical circuit operable to provide an electrical drive signal the light emitting diode die and to receive an electrical signal produced by the photodetector die.

7. A bar code scanner comprising all the elements of an optical sensor module in accordance with claim 6 mounted in a housing.

8. An optical sensor module in accordance with claim 1, further comprising an optical barrier positioned between the light emitting diode die and the photodetector die, the optical barrier sized to prevent light from the light emitting diode die reaching the photodetector die along a direct optical path, the optical barrier being further positioned between the emitter lens and the collector lens.

9. An optical sensor module in accordance with claim 1, wherein the light emitting diode die emits infrared light.

10. An optical sensor module in accordance with claim 1, wherein the light emitting diode die emits visible light.

11. An optical sensor module comprising:
an aspherical emitter lens having an optical axis;
a light emitting diode die positioned to illuminate the aspherical emitter lens
and displaced from the optical axis of the aspherical emitter lens;
an aspherical collector lens having an optical axis; and
a photodetector die positioned to receive light from the aspherical collector lens and displaced from the optical axis of the aspherical collector lens; wherein the aspherical emitter lens is operable to focus light from the emitting diode die within a specified diameter at specified distance from the light emitting diode die and the aspherical collector lens is operable to focus light received from outside of the photodetector die within a specified diameter at the photodetector die, wherein the light emitting diode die is embedded in the aspherical emitter lens.

12. An optical sensor module comprising:

an aspherical emitter lens having an optical axis;

a light emitting diode die positioned to illuminate the aspherical emitter lens and displaced from the optical axis of the aspherical emitter lens; an aspherical collector lens having an optical axis; and a photodetector die positioned to receive light from the aspherical collector lens and displaced from the optical axis of the aspherical collector lens; wherein the aspherical emitter lens is operable to focus light from the emitting diode die within a specified diameter at specified distance from the light emitting diode die and the aspherical collector lens is operable to focus light received from outside of the photodetector die within a specified diameter at the photodetector die, wherein the photodetector die is embedded in the aspherical collector lens.

* * * * *